US008843253B1

(12) United States Patent
Chapman

(10) Patent No.: US 8,843,253 B1
(45) Date of Patent: Sep. 23, 2014

(54) AIRCRAFT ICE PROTECTION CONTROL SYSTEM AND METHOD FOR MITIGATING ENGINE OVER-BLEED

(71) Applicant: Honeywell International Inc., Morristown, NJ (US)

(72) Inventor: Gregory J. Chapman, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/855,304

(22) Filed: Apr. 2, 2013

(51) Int. Cl.
G06F 7/70 (2006.01)
B64D 15/04 (2006.01)
F02C 6/08 (2006.01)
B64D 15/22 (2006.01)

(52) U.S. Cl.
CPC .................................... B64D 15/22 (2013.01)
USPC ............................ 701/14; 244/134 R; 60/782

(58) Field of Classification Search
USPC ............................ 701/14; 244/134 R; 60/785
See application file for complete search history.

(56) References Cited

U.S. PATENT DOCUMENTS 5,540,252 A * 7/1996 Bruun ............................ 137/220
7,575,196 B2 * 8/2009 Chapman et al. ......... 244/134 B
7,959,109 B2 * 6/2011 Dasilva et al. ............ 244/134 R
8,033,118 B2 * 10/2011 Monteiro et al. ............... 60/782
8,267,122 B2 * 9/2012 Weber et al. ................... 137/892
2008/0142638 A1 * 6/2008 Chapman et al. ......... 244/134 R
2012/0304663 A1 * 12/2012 Weber et al. .................... 60/785

FOREIGN PATENT DOCUMENTS

WO 03053781 A1 7/2003

OTHER PUBLICATIONS

Liu, G. et al; A Master-Slave Approach to Aircraft Engine Bleed Flow Sharing Control, Proceeding of the 2004 American Control Conference, Boston, MA Jun. 30-Jul. 2, 2004, FrP16.5.
Papadakis, M. et al; Icing Tunnel Experiments with a Hot Air Anti-Icing System, 46th AIAA Aerospace Sciences Meeting, Jan. 1, 2008-Jan. 10, 2008.

* cited by examiner

Primary Examiner — Thomas G Black
Assistant Examiner — Tyler Paige
(74) Attorney, Agent, or Firm — Ingrassia Fisher & Lorenz, P.C.

(57) ABSTRACT

A system and method for controlling aircraft anti-ice bleed air flow in an anti-ice system. The system includes a modulating shut-off valve that is moveable between a closed position and a plurality of open positions. Bleed air pressure upstream of the modulating shut-off valve is measured when the modulating shut-off valve is in the closed position. When an anti-ice initiation signal is received in a processor, the processor determines, based on at least the measured bleed air pressure when the anti-ice initiation signal was received, an initial open position of the modulating shut-off valve. The processor also commands the modulating shut-off valve to move to the initial open position, determines when a predetermined event occurs, and commands the modulating shut-off valve to remain in the initial open position until the predetermined event occurs period.

19 Claims, 2 Drawing Sheets

AIRCRAFT ICE PROTECTION CONTROL SYSTEM AND METHOD FOR MITIGATING ENGINE OVER-BLEED

TECHNICAL FIELD

The present invention generally relates to aircraft anti-ice systems, and more particularly relates to an aircraft ice protection control system and method that mitigates engine over-bleed.

BACKGROUND

When an aircraft is flown during certain atmospheric conditions, ice can form and potentially accumulate on one or more of its exterior surfaces. Such ice formation and accumulation can result from, for example, impingement of atmospheric water droplets. The formation and accumulation of ice on some exterior surfaces can have adverse and/or deleterious effects on aircraft performance.

For example, following its formation on an exterior surface, ice can break loose and enter the aircraft engines, or collide with protruding surfaces such as antennas, wings, moveable control surfaces, or various structures on the ground. Ice accumulation on airfoil surfaces such as wings and empennages can also adversely affect airfoil aerodynamic performance. In addition, the weight of any accumulated ice may change the overall weight and/or center of gravity of the aircraft. Moreover, ice accumulation on moveable surfaces may interfere with the operation of the moveable surface. Consequently, many aircraft include an ice protection system that either prevents the formation of ice on aircraft surfaces or removes ice that forms on such surfaces.

The ice protection systems in many aircraft include one or more conduits, such as piccolo tubes, to deliver hot engine bleed air to the exterior surfaces that are to be anti-iced/de-iced. One or more upstream shut-off valves may also be mounted on the conduits to selectively supply and shut-off the flow of bleed air to the downstream surfaces. Many presently known ice protection systems may also include various control features such as, for example, pressure regulating valves, temperature feedback, valve opening rate controls, etc.

The presently known systems described above, while generally safe and reliable, do suffer certain drawbacks. For example, these systems can cause the flow of engine bleed air to exceed desired limits (e.g., engine over-bleeding). Hence, there is a need for an aircraft ice protection control system and method that mitigates engine over-bleed. The present invention addresses at least this need.

BRIEF SUMMARY

In one embodiment, a method of controlling aircraft anti-ice bleed air flow in an anti-ice system that comprises a modulating shut-off valve that is moveable between a closed position and a plurality of open positions includes measuring, when the modulating shut-off valve is in the closed position, bleed air pressure upstream of the modulating shut-off valve. An anti-ice initiation signal is received in a processor, and the processor is used to determine, based on at least the measured bleed air pressure when the anti-ice initiation signal was received, an initial open position of the modulating shut-off valve. The processor is also used to command the modulating shut-off valve to move to the initial open position, determine when a predetermined event occurs, and command the modulating shut-off valve to remain in the initial open position until the predetermined event occurs period.

In another embodiment, an aircraft anti-ice system includes a conduit, a modulating shut-off valve, a pressure sensor, and an anti-ice controller. The conduit is adapted to receive a flow of bleed air. The modulating shut-off valve is mounted on the conduit and is responsive to valve position commands to move between a closed position and a plurality of open positions. The pressure sensor is configured to sense bleed air pressure upstream of the modulating shut-off valve and supply a bleed air pressure signal representative thereof. The anti-ice controller is in operable communication with the bleed air pressure sensor and the modulating shut-off valve. The anti-ice controller is adapted to receive an anti-ice initiation signal and is configured, upon receipt thereof, to determine, based on at least the sensed bleed air pressure when the anti-ice initiation signal was received, an initial open position of the modulating shut-off valve, determine when a predetermined event occurs, and supply valve position commands to the modulating shut-off valve that cause the modulating shut-off valve to move from the closed position to the initial open position and remain in the initial open position until the predetermined event occurs.

In still another embodiment, an aircraft anti-ice system includes a first conduit, a second conduit, a first modulating shut-off valve, a first pressure sensor, a second modulating shut-off valve, a second pressure sensor, and an anti-ice controller. The first conduit is adapted to receive a first flow of bleed air, and the second conduit is adapted to receive a second flow of bleed air. The first modulating shut-off valve is mounted on the first conduit and is responsive to first valve position commands to move between a closed position and a plurality of open positions. The first pressure sensor is configured to sense bleed air pressure upstream of the first modulating shut-off valve and supply a first bleed air pressure signal representative thereof. The second modulating shut-off valve is mounted on the second conduit and is responsive to second valve position commands to move between a closed position and a plurality of open positions. The second pressure sensor is configured to sense bleed air pressure upstream of the second modulating shut-off valve and supply a second bleed air pressure signal representative thereof. The anti-ice controller is in operable communication with the first and second bleed air pressure sensors and the first and second modulating shut-off valves. The anti-ice controller is adapted to receive an anti-ice initiation signal and is configured, upon receipt thereof, to determine, based on at least the sensed first and second bleed air pressures when the anti-ice initiation signal was received, initial open positions of the first and second modulating shut-off valves, determine when a predetermined event occurs, and supply valve position commands to the first and second modulating shut-off valves that cause the first and second modulating shut-off valves to move from the closed positions to the initial open positions and remain in the initial open positions until the predetermined event occurs.

Furthermore, other desirable features and characteristics of the anti-ice system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
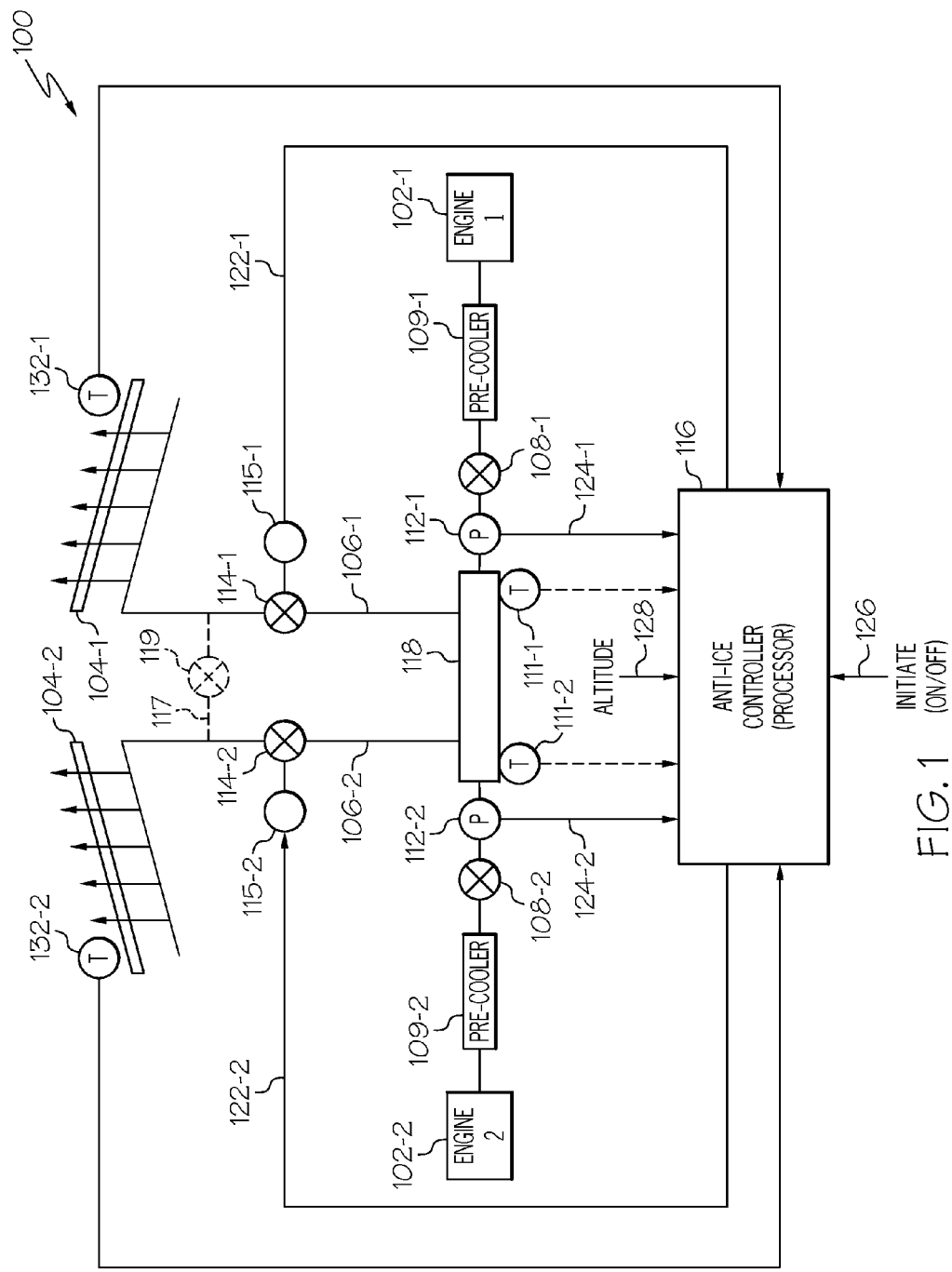
FIG. 1 depicts a schematic representation of an exemplary embodiment of an ice protection system.

Referring now to FIG. 1, a schematic representation of an exemplary embodiment of an ice protection system 100 for a dual-engine aircraft is depicted. The depicted system 100 relies on a flow of relatively hot bleed air from a first aircraft engine 102-1 to anti-ice/de-ice a right hand aircraft wing 104-1 (or other exterior surface), and from a second aircraft engine 102-2 to anti-ice/de-ice a left hand aircraft wing 104-2 (or other exterior surface). The system 100 additionally includes first and second conduits or ducts 106 (106-1, 106-2), which may include piccolo tubes at the associated wings 104-1, 104-2, first and second shut-off valves 108 (108-1, 108-2), first and second pressure sensors 112, (112-1, 112-2), first and second modulating shut-off valves 114 (114-1, 114-2), and an anti- ice controller 116. Before proceeding further, it is noted that the system 100 could be implemented in a single-engine aircraft and/or the source of relatively hot air could be one or more other components, subsystems, or devices, not just aircraft engines. Thus, in some implementations, the system 100 could include only a single conduit or duct. Moreover, the relatively hot air could be supplied to various other aircraft surfaces including, for example, engine nacelles, and empennages, just to name a few.

Returning to the description, it is seen that the first conduit 106-1 is coupled to receive a first flow of bleed air from the first engine 102-1, via the first shut-off valve 108-1, an optional first pre-cooler 109-1, and an optional manifold 118, and to direct the first flow of bleed air to the leading edge of the right hand wing 104-1. Similarly, the second conduit 106-2 is coupled to receive a second flow of bleed air from the second engine 102-2, via the second shut-off valve 108-2, an optional second pre-cooler 109-2, and the optional manifold 118, and to direct the second flow of bleed air to the leading edge of the left hand wing 104-2. The first and second shut-off valves 108, which are also optional, may be implemented as pressure regulating shut-off valves or as check valves, and may be configured to selectively supply the bleed air flows to the associated conduits 106. The first and second pre-coolers 109-1, 109-2, if included, condition the bleed air from the first and second engines 102-1, 102-2, respectively, to a relatively constant temperature. It is noted that without the first and second pre-coolers 109-1, 109-2, the temperature of the bleed air supplied to the first and second conduits 106-1, 106-2 would be more variable. In such embodiments, and as shown using dotted lines in FIG. 1, the system 100 may additionally include first and second temperature sensors 111-1, 111-2 in or near the manifold to sense bleed air temperature and supply temperature signals representative thereof to the anti-ice controller 116.

The first and second pressure sensors 112-1, 112-2 are configured to sense bleed air pressure upstream of the first and second modulating shut-off valves 114-1, 114-2, respectively. The first pressure sensor 112-1 is additionally configured to supply a first bleed air pressure signal 124-1 representative of the sensed bleed air pressure to the anti-ice controller 116. The second pressure sensor 112-2 is additionally configured to supply a second bleed air pressure signal 124-2 representative of the sensed bleed air pressure to the anti-ice controller 116.

The first and second modulating shut-off valves 114-1, 114-2 are mounted on the first and second conduits 106-1, 106-2, respectively, and are configured as normally-closed valves. The first modulating shut-off valve 114-1 is response to first valve position commands 122-1 to move between a closed position and a plurality of open positions, and the second modulating shut-off valve 114-2 is response to second valve position commands 122-2 to move between a closed position and a plurality of open positions. In this regard, the first and second modulating shut-off valves 114-1, 114-2 each include an actuator 115 (115-1, 115-2) that is coupled to receive the valve position commands 122 and is configured, upon receipt thereof, to move its associated modulating shut-off valve 114 to the commanded position. The actuators 115 may be variously configured and implemented using any one of numerous electric, electromechanical, electro-hydraulic, or electro-pneumatic types of devices. No matter the specific implementation, the actuators 115 are coupled to receive the valve position commands from the anti-ice controller 116.

Before describing the functionality of the anti-ice controller 116, it is noted that FIG. 1 further depicts, in phantom, an optional cross-over conduit 117 and an optional cross-over valve 119. The cross-over conduit 117, if included, is coupled between the first and second conduits 106-1, 106-2 downstream of the first and second modulating shut-off valves 114-1, 114-2. The cross-over valve 119, if included, is mounted on the cross-over conduit 117, and is moveable between a closed position and an open position. Normally, the cross-over valve 119 is closed, fluidly isolating the first and second conduits 106-1, 106-2 from each other. However, in the unlikely event one of the engines 102 were to become inoperable, or for some other reason bleed air flow could not be supplied to one of the conduits 106, the cross-over valve 119 could be opened, either manually or automatically. When open, the first and second conduits 106-1, 106-2 are in fluid communication, and bleed air being supplied to one of these conduits 106-1 (106-2) can also be supplied to the other conduit 106-2 (106-1).

The anti-ice controller 116, which may be implemented using one or more processors and memory devices, is in operable communication with the first and second bleed air pressure sensors 112-1, 112-2, and with the first and second modulating shut-off valves 114-1, 114-2. As FIG. 1 also depicts, the anti-ice controller 116 is additionally coupled to receive an anti-ice initiation signal 126 (e.g., an on/off signal). The initiation signal 126 may be supplied, for example, from a pilot manipulated switch located in the aircraft cockpit. No matter the source of the initiation signal 126, the anti-ice controller 116 is configured, upon receipt thereof, to command the first and second modulating shut-off valves 114-1, 114-2 to move to initial open positions that are based at least upon the sensed bleed air pressures when the anti-ice initiation signal 126 was received. The anti-ice controller 116 will command the first and second modulating shut-off valves 114-1, 114-2 to remain in these initial open positions until a predetermined event occurs.

Figure 2:
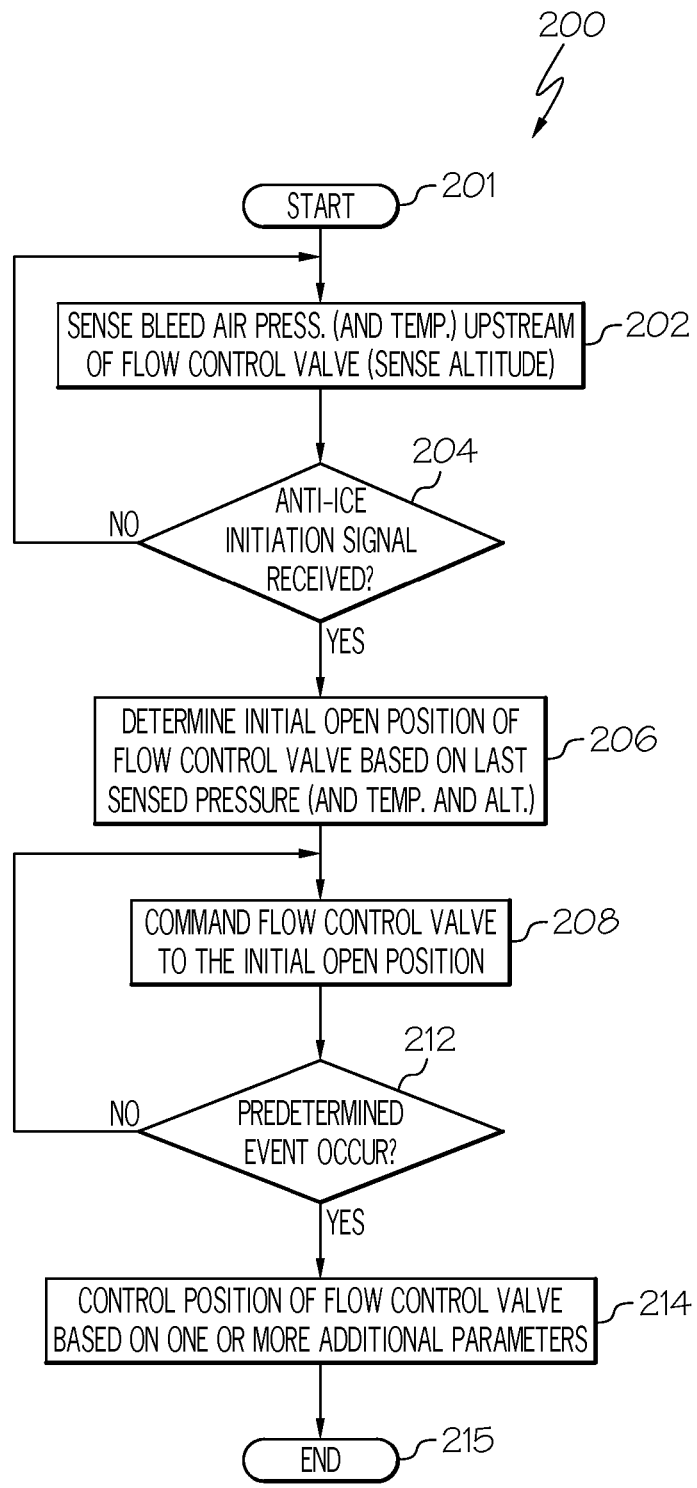
FIG. 2 depicts a process, in flowchart form, that may be implemented by the system depicted in FIG. 1.

More specifically, and with reference to FIG. 2, which depicts the above-described process in more detail in flowchart form, it is seen that the first and second pressure sensors 112-1, 112-2 continuously sense bleed air pressure upstream of the first and second modulating shut-off valves 114-1, 114-2, respectively, and supply the first and second pressure signals 124-1, 124-2 to the anti-ice controller 116 (202). As FIG. 2 also depicts in parentheses in block 202, in some embodiments aircraft altitude may also be sensed. Thus, with reference back to FIG. 1, it is seen that the anti-ice controller 116 may also receive an altitude signal representative of aircraft altitude 128 from, for example, a dedicated sensor or aircraft avionics. Moreover, as previously mentioned, in some embodiments the anti-ice controller 116 may also receive temperature signals from the first and second temperature sensors 111-1, 111-2.

It should be noted that in some embodiments, the anti-ice controller 116 may have default values of bleed air pressure, temperature, and/or altitude stored therein. The default values, if included, are used in the unlikely event that the sensed values are lost or otherwise unavailable. The default values are predetermined values that are selected based, for example, upon the operating envelope of the aircraft with faulted or otherwise unavailable sensors.

The anti-ice controller 116 will continue to receive, and may also process, the bleed air pressure signals 124-1, 124-2 and the altitude signal 128, but it will not generate and supply any valve position commands until the initiation signal 126 is received (204). When the initiation signal 126 is received, the anti-ice controller 116 determines initial open positions of the first and second modulating shut-off valves 114-1, 114-2. The initial open positions are based on at least the first and second bleed air pressures that were sensed when the initiation signal 126 was received (206). As noted above, the initial open positions may additionally, in some embodiments, be based on the sensed aircraft altitude when the initiation signal 126 was received.

Before proceeding further, it is noted that some gas turbine engines, such as turbofan gas turbine engines, are primarily controlled to a shaft speed schedule or a nozzle pressure schedule. At constant shaft speed or nozzle pressure, as the engine supplies bleed air, fuel will be added to make up for the bleed energy extraction and, as a result, turbine operating temperature rises. Typically, the engine controller is configured to slow the engine when bleed air extraction begins to maintain turbine temperature. This slowing of the engine will cause a decrease in bleed air pressure and possibly a decrease in pressure in the manifold 118. In some implementations, the bleed air system and engine controller are configured so that the engine is slowed down prior to opening the aircraft bleed valves to further reduce the possibility of a temperature increase. It will thus be appreciated that steps 202-206 may be implemented before the associated engines 102-1, 102-2 are slowed for bleed air initiation and before the first and second modulating shut-off valves 114-1, 114-2 are opened. Alternatively, steps 202-206 could be implemented after the associated engines 102-1, 102-2 are slowed for bleed air initiation and before the first and second modulating shut-off valves 114-1, 114-2 are opened.

Proceeding once again with the description of the process, the anti-ice controller 116, upon determining the initial positions, then generates and supplies valve position commands 122-1, 122-2 to the first and second modulating shut-off valves 114-1, 114-2 that cause the first and second modulating shut-off valves 114-1, 114-2 to move from the closed positions to the initial open positions (208). The anti-ice controller 116 will also then begin determining when a predetermined event has occurred (212). It will be appreciated that the predetermined event may vary. For example, the predetermined event may be the lapse of a predetermined time period, or it may be another control function (described further below) within the anti-ice controller 116 needing to control the modulating shut-off valve.

Until the predetermined event does occur, the anti-ice controller 116 will continue to generate and supply valve commands 122-1, 122-2 that will cause the first and second modulating shut-off valves 114-1, 114-2 to remain in the initial open positions. However, upon occurrence of the predetermined event, the anti-ice controller 116 is further configured to command the modulating shut-off valves 114-1, 114-2 to move, as needed, to a position based on one or more parameters in addition to or instead of the upstream pressures and altitude (214). These additional parameters may vary, but in the embodiment depicted in FIG. 1, the additional parameter is temperature. Thus, as illustrated in FIG. 1, the system 100 additionally includes first and second temperature sensors 132 (132-1, 132-2). The first and second temperature sensors 132-1, 132-2 are configured to sense an aircraft surface temperature and supply a temperature signal representative thereof to the anti-ice controller 116. The particular aircraft surface temperature that is sensed may vary, but in the depicted embodiment, the surface temperatures of the right hand and left hand aircraft wings 104-1, 104-2, an more specifically the leading edges thereof, are sensed.

When the ice protection system 100 is first activated, and the first and second modulating shut-off valves 114-1, 114-2 are opened, the bleed air pressure upstream of the first and second modulating shut-off valves 114-1, 114-2 will droop as the bleed air flow from the first and second engines 102-1, 102-2 increases. In presently known systems, this pressure droop could result in over-bleeding of the first and second engines 102-1, 102-2. However, with the ice protection system 100 described herein, although the bleed air pressure may still droop upon activation, the initial open positions of the first and second modulating shut-off valves 114-1, 114-2 will prevent over-bleeding.

In view of the above, it may thus be appreciated that the anti-ice controller 116 is preferably implemented with a schedule of initial position versus bleed air pressure. Because the bleed air pressure droop and bleed air flow characteristics may vary from aircraft type to aircraft type, schedules of initial position versus bleed air pressure are determined for a plurality of different aircraft. The anti-ice controller 116 is then configured to implement the schedule appropriate to the aircraft in which the anti-ice system 100 is installed.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling aircraft anti-ice bleed air flow in an anti-ice system comprising a modulating shut-off valve that is moveable between a closed position and a plurality of open positions, the method comprising the steps of:
   measuring, when the modulating shut-off valve is in the closed position, bleed air pressure upstream of the modulating shut-off valve;
   receiving, in a processor, an anti-ice initiation signal; and
   using the processor to:
      determine, based on at least the measured bleed air pressure when the anti-ice initiation signal was received, an initial open position of the modulating shut-off valve,
      command the modulating shut-off valve to move to the initial open position,
      determine when a predetermined event occurs, and
      command the modulating shut-off valve to remain in the initial open position until the predetermined event occurs period.

2. The method of claim 1, further comprising:
   measuring aircraft altitude; and
   using the processor to determine the initial open position of the modulating shut-off valve based additionally on the measured aircraft altitude when the anti-ice initiation signal was received.

3. The method of claim 1, further comprising:
   upon occurrence of the predetermined event, using the processor to command the modulating shut-off valve to move to an open position based on one or more additional parameters.

4. The method of claim 3, wherein the one or more additional parameters includes a measured aircraft surface temperature.

5. The method of claim 1, wherein the predetermined event comprises a lapse of a predetermined time period.

6. The method of claim 1, wherein the predetermined event comprises another control function within the processor needing to control the modulating shut-off valve.

7. The method of claim 1, further comprising:
   determining a schedule of initial position versus bleed air pressure for a plurality of different aircraft; and
   using the schedule appropriate to the aircraft in which the anti-ice system is installed to determine the initial open position of the modulating shut-off valve.

8. An aircraft anti-ice system, comprising:
   a conduit adapted to receive a flow of bleed air;
   a modulating shut-off valve mounted on the conduit and responsive to valve position commands to move between a closed position and a plurality of open positions;
   a pressure sensor configured to sense bleed air pressure upstream of the modulating shut-off valve and supply a bleed air pressure signal representative thereof; and
   an anti-ice controller in operable communication with the bleed air pressure sensor and the modulating shut-off valve, the anti-ice controller adapted to receive an anti-ice initiation signal and configured, upon receipt thereof, to:
determine, based on at least the sensed bleed air pressure when the anti-ice initiation signal was received, an initial open position of the modulating shut-off valve,
determine when a predetermined event occurs, and
supply valve position commands to the modulating shut-off valve that cause the modulating shut-off valve to (i) move from the closed position to the initial open position and (ii) remain in the initial open position until the predetermined event occurs.

9. The system of claim 8, wherein the anti-ice controller is:
adapted to receive an altitude signal representative of aircraft altitude; and
configured to determine the initial open position of the modulating shut-off valve based additionally on the aircraft altitude when the anti-ice initiation signal was received.

10. The system of claim 8, wherein the anti-ice controller is further, upon occurrence of the predetermined event, to command the modulating shut-off valve to move to an open position based on one or more additional parameters.

11. The system of claim 8, further comprising:
a temperature sensor configured to sense an aircraft surface temperature and supply a temperature signal representative thereof to the anti-ice controller,
wherein the one or more additional parameters includes the aircraft surface temperature.

12. The system of claim 8, wherein the predetermined event comprises a lapse of a predetermined time period.

13. The system of claim 8, wherein the predetermined event comprises another control function within the processor needing to control the modulating shut-off valve.

14. An aircraft anti-ice system, comprising:
a first conduit adapted to receive a first flow of bleed air;
a second conduit adapted to receive a second flow of bleed air;
a first modulating shut-off valve mounted on the first conduit and responsive to first valve position commands to move between a closed position and a plurality of open positions;
a first pressure sensor configured to sense bleed air pressure upstream of the first modulating shut-off valve and supply a first bleed air pressure signal representative thereof;
a second modulating shut-off valve mounted on the second conduit and responsive to second valve position commands to move between a closed position and a plurality of open positions;
a second pressure sensor configured to sense bleed air pressure upstream of the second modulating shut-off valve and supply a second bleed air pressure signal representative thereof; and
an anti-ice controller in operable communication with the first and second bleed air pressure sensors and the first and second modulating shut-off valves, the anti-ice controller adapted to receive an anti-ice initiation signal and configured, upon receipt thereof, to:
determine, based on at least the sensed first and second bleed air pressures when the anti-ice initiation signal was received, initial open positions of the first and second modulating shut-off valves,
determine when a predetermined event occurs, and
supply valve position commands to the first and second modulating shut-off valves that cause the first and second modulating shut-off valves to (i) move from the closed positions to the initial open positions and (ii) remain in the initial open positions until the predetermined event occurs.

15. The system of claim 14, wherein the anti-ice controller is:
adapted to receive an altitude signal representative of aircraft altitude; and
configured to determine the initial open position of the modulating shut-off valve based additionally on the aircraft altitude when the anti-ice initiation signal was received.

16. The system of claim 14, wherein the anti-ice controller is further configured, upon occurrence of the predetermined event, to command the modulating shut-off valve to move to an open position based on one or more additional parameters.

17. The system of claim 14, further comprising:
a first temperature sensor configured to sense a first aircraft surface temperature and supply a first temperature signal representative thereof to the anti-ice controller; and
a second temperature sensor configured to sense a second aircraft surface temperature and supply a second temperature signal representative thereof to the anti-ice controller,
wherein the one or more additional parameters includes the first and second aircraft surface temperature.

18. The system of claim 14, wherein the predetermined event comprises a lapse of a predetermined time period.

19. The system of claim 14, wherein the predetermined event comprises another control function within the anti-ice controller needing to control the modulating shut-off valve.

* * * * *